United States Patent

Ohta et al.

[11] Patent Number: 6,067,285
[45] Date of Patent: May 23, 2000

[54] OPTICAL DISC

[75] Inventors: Kenji Ohta, Kitakatsuragi-gun; Toshikazu Nagaura; Masayasu Futagawa, both of Nara; Shinji Yamagami, Tenri; Yoshiteru Murakami, Nishinomiya-sho; Hiroyuki Ikenaga, Nara; Michinobu Mieda, Shiki-gun; Tetsuya Inui; Akira Takahashi, both of Nara, all of Japan

[73] Assignee: Sharp Kabushiki Kaisha, Osaka, Japan

[21] Appl. No.: 08/054,125

[22] Filed: Apr. 27, 1993

[30] Foreign Application Priority Data

Apr. 27, 1992 [JP] Japan ................................. 4-108002

[51] Int. Cl.[7] ................................. G11B 3/70; G11B 5/84
[52] U.S. Cl. ................................................. 369/288
[58] Field of Search .................................... 369/283, 288, 369/275.1, 275.5; 428/694 DE, 694 TP, 694 BP, 695

[56] References Cited

U.S. PATENT DOCUMENTS 5,274,623  12/1993  Usami et al. ........................ 369/275.1

FOREIGN PATENT DOCUMENTS 467705  1/1992  European Pat. Off. ............ 369/275.5
158055  9/1983  Japan ................................. 369/275.5
157837  7/1991  Japan ................................. 369/275.5

OTHER PUBLICATIONS

Extended Abstracts (The 49th Autumn Meeting, 1988): The Japan Society of Applied Physics, No. 3.

Extended Abstracts ( The 35th Spring Meeting 1988): The Japan Society of Applied Physics and Related Societies, No. 3.

*Primary Examiner*—George J. Letscher
*Attorney, Agent, or Firm*—Dike, Bronstein, Roberts & Cushman, LLP; David G. Conlin; William J. Daley, Jr.

[57] ABSTRACT

An optical disc having a recording film formed on one surface of a plastics substrate transparent to light, a first protection film formed on the recording film, a moisture proof film formed on the other surface of the substrate, and a second protection film formed on the moisture proof film.

7 Claims, 3 Drawing Sheets

OPTICAL DISC

BACKGROUND OF THE INVENTION

1. Field of the Invention

The present invention relates to optical discs, and more particularly to an optical disc for recording and reproducing data by a laser beam.

2. Description of the Related Art

Figure 6:
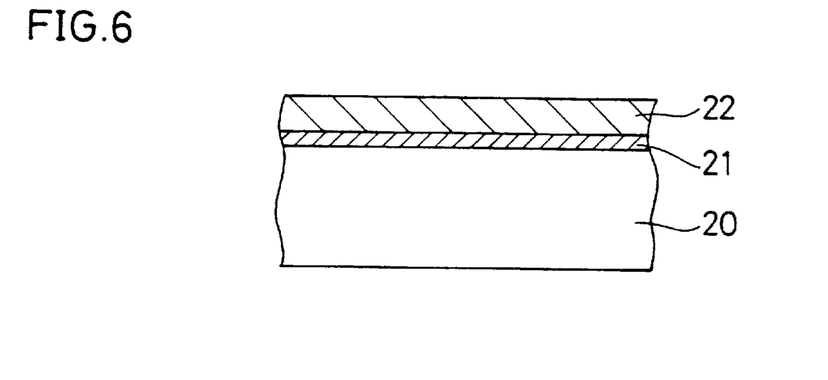
FIG. 6 is a view illustrating a conventional counterpart of the optical disc.

Conventional counterparts of optical discs are constructed by forming a recording film 21 on one surface of a plastics substrate 20 and covering the recording film 21 with a protection film 22 as shown in FIG. 6.

Since the recording film 21 generally consists of four or three layers, moisture will not permeate through the recording film 21 to the other side of the plastics substrate 20. Consequently, these optical discs tend to absorb or desorb moisture only at the other side of the plastics substrate 20, i.e. at the incident side. Moisture absorption and desorption was caused by a partial variation in volume of the plastics substrate 20 to generate a warp thereof.

The above warp of the optical discs cause the substrate surface to shift from the position perpendicular to optical axis of the laser beam incident for recording and reproducing data with the result that the incident light fails to strike signals, thereby causing the servo control to get disordered to degrade the resulting signal quality or to generate a track jump in servo control in extreme cases.

Under these circumstances, there have been proposed standards or draft standards with regard to the warp of optical discs as shown in Table 1.

TABLE 1

| Type of optical discs | Level of warp |
| --- | --- |
| Compact disc | 10 mrad max. |
| Write-once disc | 5 mrad max. |
| Magneto-optic disc | 5 mrad max. |

Compact discs have a relatively slow rotating speed practically ranging from 200 to 500 rpm, which can be sufficiently tracked by the tracking servo and the focus servo. Thus, another mild standard on warp is applied to the optical discs in comparison with the counterpart applied to other types of optical discs.

Such discs as write-once discs and rewritable discs (magneto-optic discs) require an increase in the data transfer rate and hence must rotate at a high speed (1800 to 3600 rpm for example). For such discs, the warp level needs to be reduced as much as possible to meet with the tracking capabilities of the tracking servo and the focus servo. However, a single plate plastics substrate hardly reduces the warp level. Thus, single-plate discs have been laminated to each other back-to-back to provide a double-sided disc, thereby reducing the warp level.

However, the overwriting technique has come to capture much attention recently to increase a demand for single-sided discs. That is because conventional magneto-optic discs involve the step of erasing old data prior to recording new data for rewriting data. Consequently, they need two rotations in total to rewrite data; the first rotation for erasing old data and the second rotation for recording new data. In contrast, the overwriting-technique permits erasing old data and recording new data in one rotation to obviate the conventional process of two rotations, thereby increasing the data transfer rate.

There have been proposed so far several methods for overwriting, among which the magnetic field modulation method is one of the most promising ones. The magnetic field modulation method involves recording data by shifting the direction of the magnetic field while continuing the application of light onto the surface of optical discs whereas a data erasing dependent method (optical modulation method) involves recording data by intermittently applying light with the magnetic field kept to a certain direction.

The magnetic field modulation method demands shifting the direction of the magnetic field at a high speed. Besides, actualizing a high-speed magnetic field modulation by minimizing the consumption of electric power in the electromagnet requires a minimization of the distance between the electromagnets and the recording film. However, with respect to double-sides discs, the presence of the substrate on the recording film as viewed from the side provided with an electromagnet inhibits the reduction of the distance between the recording film and the electromagnet, which has created an increased demand for single-side discs.

Using a plastics substrate for single plate discs will naturally compel users to meet with the possibility of the warp of discs. The warp generated immediately after the manufacturing process can be suppressed to a level within the scope of the standard because of the advancement of the technique for forming the substrate, as well as the technique for forming the recording film and the protection film. On the other hand, it has been made clear that another kind of a warp has been generated in using discs. For example, the 35th Applied Physics Association Drafts, in spring 1988, describes on page 872 that it has been made clear that a change in the environmental conditions generates a transient warp of discs. For example, according to the document, a change in relative humidity from 90% R. H. to 50% R. H. at 60% has changed the warp by 14 to 15 mrad at most.

SUMMARY OF THE INVENTION

The present invention provides an optical disc comprising a recording film formed on one surface of a plastics substrate transparent to light, a first protection film formed on the recording film, a moisture proof film formed on the other surface of the substrate, and a second protection film formed on the moisture proof film.

Further preferably, a lubricant film is formed on the first protection film or an anti-static film is formed on the second protection film.

Still further preferably, the moisture proof film is formed of either AlSiN, AlTaN, TaO, SiO or $TiO_2$, its thickness is in the range of 1 to 20 nanometers and a product of the refractive index and the thickness is within the range of not exceeding 42 nanometers.

Still further preferably, the first protection film and the second protection film have a thickness of 2 to 20 micrometers and an approximately same thickness.

BRIEF DESCRIPTION OF THE DRAWINGS

An embodiment of the present invention will be detailed in accordance with the accompanying drawings in which.

DETAILED DESCRIPTION OF THE INVENTION

The present invention has been made in view of the conventional problems mentioned above to provide an optical disc capable of reducing a transient warp of the disc as much as possible at environmental changes.

The optical disc of the present invention comprises a recording film and a first protection film for protecting the recording film on one side of the plastics substrate.

The transparent plastics substrate may be of any plastics material as long as it allows light to pass therethrough and resist deformation. Typical examples thereof include polycarbonate substrate. In addition, the substrate may be formed of such material as acrylic resin, epoxy resin, or the like. The thickness of the substrate usually ranges between 1.15 and 1.25 mm.

The recording film of the present invention may be any conventional recording film, which for example comprises a recording layer of a rare earth metal compound, dielectric layer of a metal nitride and a reflective layer of an aluminum. Typical examples include a four layer structure such as AlSiN/DyFeCo/AlSiN/Al, AlN/GdTbFe/AlN/Al, and AlN/DyFeCo/AlN/Al, and a three-layer structure such as SiN/TbFeCo/SiN and SiAlON/TbFeCo/SiAlON. The recording film generally has a thickness of 150 to 300 nm. The recording film is generally formed on the entire surface of the plastic substrate, but it may be formed on the part of the surface thereof.

The first and the second protection film can be provided primarily for protecting the recording film. The film can be formed of such material as urethane acrylate ultra-violet curing resin, polyvinylidene chloride resin or polytrifluorochloroethylene resin. The film can be formed by a coating process. Each of these films has a thickness of 2 to 20 μm. Preferably, the first and the second protection films have an approximately equal thickness.

The moisture proof film can be formed of inorganic material such as AlSiN, AlTaN, TaO, SiO, $TiO_2$, AlN, SiN, ZnS, $Al_2O_3$, $SiO_2$, and SiAlOH. Among the above-mentioned material, AlSiN, AlTaN, TaO, SiO, and $TiO_2$ are particularly preferable.

In spite of forming the moisture proof film on the surface of the substrate, sometimes it occurs to generate the transient warp of the optical disc such as 2 mrad, appear a moire phenomenon in the moisture proof film and consequently cause an error by the moire phenomenon for recording new data and erasing old data.

The thickness of the moisture proof film shall be determined by characteristics of the material to be used, especially the refractive index thereof. We found that the moire phenomenon of the moisture proof film can be avoided when the thickness of the film is less than a result of 42 nm divided by the refractive index of the material. Specially, when AlSiN, for example, is used as the moisture proof film, its thickness is less than 20 nm, dividing 42 nm by 2.1 (refractive index of AlSiN), while its lower value is limited mainly due to convenience of film formation. Preferably, the thickness of AlSiN film is in the range of 1 to 20 nm, more preferably 5 to 15 nm, e.g., 5 nm, 10 nm, 15 nm. Similarly, suitable thickness of other materials as above-mentioned can be determined, utilizing the refractive indices of AlTaN, TaO, SiO and $TiO_2$ being 2.1, 2.1, 2.1 and 2.5, respectively.

A lubricant film may be optionally provided on the first protection film. The lubricant film of the optical disc according to the present invention can be formed of material excellent in lubricative properties, such as, for example, fluoric resin. When using a floating type magnetic head, providing the lubricant film on the surface provided with the recording film improves lubricative properties between the floating type magnetic head and the optical magnetic head. The lubricant film has a thickness of about 2 μm.

An anti-static film may be optionally provided on the second protection film. The lubricant film and the anti-static film may not be provided.

The anti-static film of the optical disc according to the present invention consists of a conductive filler mixed resins composition containing a transparent conductive filler. The anti-static film is provided to inhibit the deposition of dusts on the surface of the optical discs, and to inhibit generation of scratches thereon. Preferably, the anti-static film is formed of hard material with a relatively low surface resistivity. Preferably, the material is more hard than HB pencils. Besides, still preferably the surface resistivity of the anti-static film usually does not exceed $10^{13}$ Ω. The process for preparing the anti-static film with the conductive filler mixed resins containing a transparent conductive filler comprises the steps of mixing a synthetic resin or a raw material thereof with the transparent conductive filler in a predetermined ratio, optionally adding a small amount of inorganic filler to be mixed with the mixture of the synthetic resin and the transparent conductive filler to improve the hardness thereof, and forming either the mixture of the synthetic resin and the transparent conductive filler or the mixture of the synthetic resin, the transparent conductive filler and the inorganic filler into a film on the substrate of the optical disc. Examples of the synthetic resin to be employed include urethane acrylate ultraviolet curing resin, acryl ultraviolet curing resin. The film is coated on the substrate by such methods as the spin coating method, the roll coating method, and the dip coating method. Depending on the kind of synthetic resin to be used, such means as ultraviolet ray irradiation, heating and cooling are used to cure the resin. Preferably, the film normally has a thickness of 1 to 20 μm.

Preferably, tin oxide is doped with phosphorus to provide a composition for use in a transparent conductive filler for incorporating both transparency and stability. In addition, tin oxide is doped with phosphorus by the coprecipitation sintering method from the liquid phase. Phosphorus to be doped can be obtained from phosphoric acid, sodium phosphate or the like. The dopant content in tin oxide preferably ranges between 3 and 7 wt. % with respect to the total amount of the conductive filler. Further preferably, the content of the conductive filler in the anti-static film ranges between 25 to 45 wt. % while the average particle diameter thereof does not exceed 0.15 μm.

EMBODIMENT

Embodiment of optical discs according to the present invention will be detailed by way of the drawings, but the present invention is not limited by it.

Embodiment 1

Figure 1:
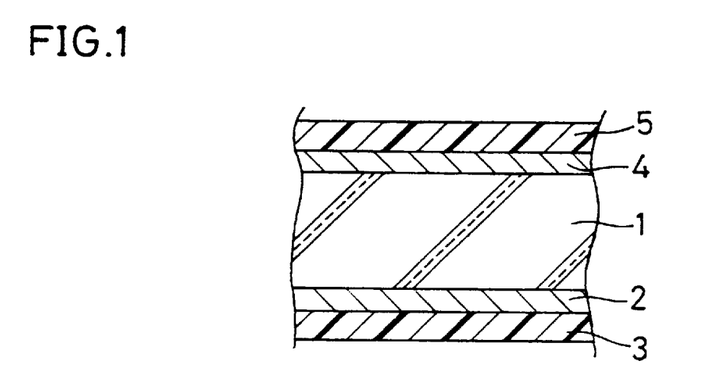
FIG. 1 is a schematic view illustrating Embodiment 1 of an optical disc according to the present invention.

Referring to FIG. 1, Reference Numeral 1 designates a plastics substrate made of 1.2 nm thick polycarbonate transparent to light. On one surface of the plastics substrate 1 is formed a recording film 2. When the recording film 2 serves as a magneto-optic recording film, the disc consists of four layers. In this particular Embodiment, there is provided on the plastics substrate 1 AlSiN/DyFeCo/AlSiN/Al in this order. Further, on this recording film 2, the first protection film 3 is formed. The first protection film 3 is formed by coating a polyurethane acrylate ultraviolet curing resin to a thickness of about 10 μm.

Reference numeral 4 designates a moisture proof-film formed on the other side of the plastics substrate 1. On the moisture proof film 4 a second protection film 5 is formed. The second protection film 5 is made of the same material as the first protection film 3. That is, polyurethane acrylate ultraviolet curing resin is used. The resin has a thickness of about 10 μm. Both the first protection film 3 and the second protection film 5 may be formed to any thickness so long as they can offset the warp generated by the moisture absorption and desorption thereon. However, they are required to have an approximately equal thickness for the above reason.

Five kinds of magneto-optic discs with the above construction respectively having a 5 nm thick, a 10 nm thick, a 20 nm thick, a 25 nm thick and a 80 nm thick AlSiN moisture proof film were manufactured and observed under natural light from the side of the second protection film (moisture proof film) to examine how moire pattern appeared thereon.

The examination clarified that no moire pattern appeared on the optical discs having 5 nm thick and 10 nm thick moisture proof films. Besides, it has been also clarified that a slight moire pattern detectable in attentive observation appeared on the optical discs having a 20 nm thick moisture proof film but the pattern was not conspicuous at all. On the other hand, moire patterns were observed on the optical discs having a 25 nm thick and a 80 nm thick moisture proof film, and the moire pattern that appeared on the optical disc having a 80 nm thick moisture proof film was even more conspicuous than the disc having a 25 nm thick moisture proof film.

Then, there was calculated a relation between the thickness of the moisture proof film 4 and the reflectance of light incident from the side of the second protection film 5 to clarify how the appearance of the moire pattern is affected by the reflectance with respect to moisture proof films 4 having a different thickness. The relation between the thickness of the moisture proof film 4 and the reflectance was calculated with respect to a three layer model having on a polycarbonate plastics substrate 1 an AlSiN moisture proof film 4 and a second protection film formed of polyurethane acrylate ultraviolet curing resin.

Incidentally, the refractive indexes of the polycarbonate, AlSiN, polyurethane acrylate ultraviolet curing resin were to 1.58, 2.1 and 1.5 respectively. The thickness of the second protection film was set to 10 μm. The light source used therein exhibited 780 nm, which commonly serves as a wavelength of a semiconductor laser widely used as a light source for optical discs. The reflectance was calculated by changing the thickness of the moisture proof film within the range of 200 nm.

The above observation of moire patterns and the calculation of the reflectance clarified that moire patterns appeared when the reflectance exhibited a large value whereas almost no moire patter appeared when the reflectance did not exceed about 8%.

Figure 2:
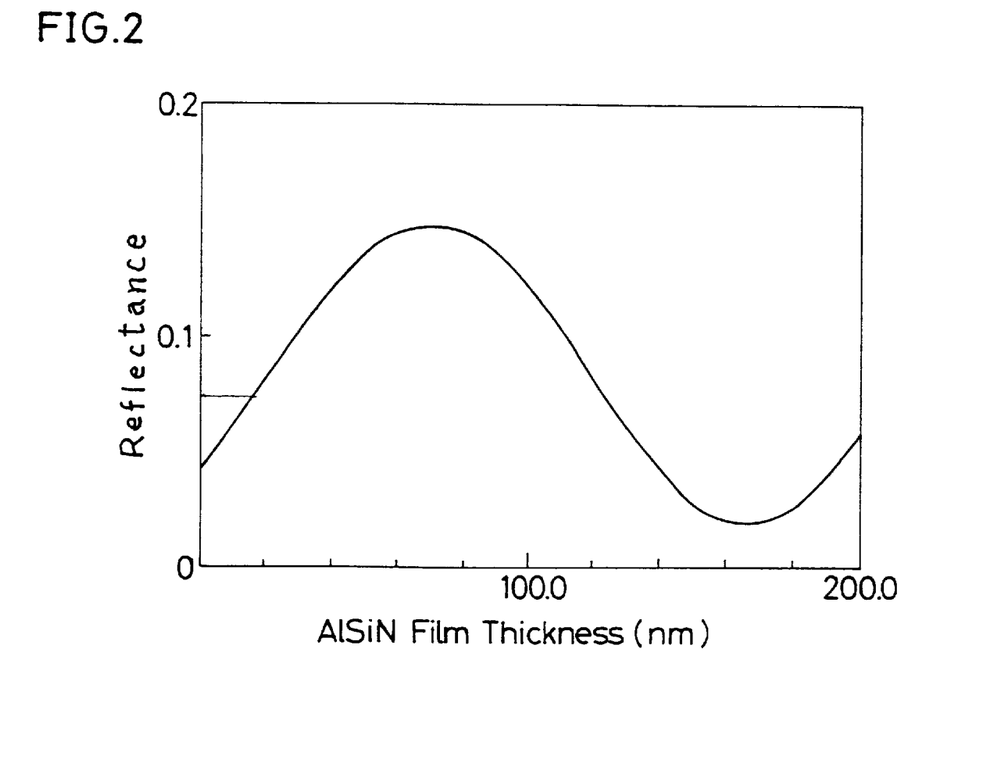
FIG. 2 is a graph showing the relations between the moisture proof film (AlSiN) and the reflectance in Embodiment 1 of the optical disc according to the present invention.

FIG. 2 shows the result of the calculation. The axis of abscissas represents the thickness of the AlSiN whereas the axis of ordinates the reflectance.

Then, there was examined how the warp of optical discs related to the thickness of the moisture proof film 4 under condition of environmental changes. First, optical discs were allowed to stand at 34° C. and 90% R. H. Then, the humidity was reduced at a rate of 10% R. H./hr to set the environmental condition of 34° C. and 30% R. H. in six hours followed by maintaining the environmental condition of 34° C. and 30% R. H. When the above environmental condition was kept, the warp level of optical discs was measured.

Incidentally optical discs used in the measurement was the same as magneto-optic discs tentatively manufactured for the test except that the moisture proof films respectively have a 1 nm thick, a 5 nm thick, 25 nm thick and 80 nm thick AlSiN film. For comparison, the conventional type magneto-optic disc identical to the above was formed except that the moisture proof film 4 and the second protection film are formed.

Figure 3:
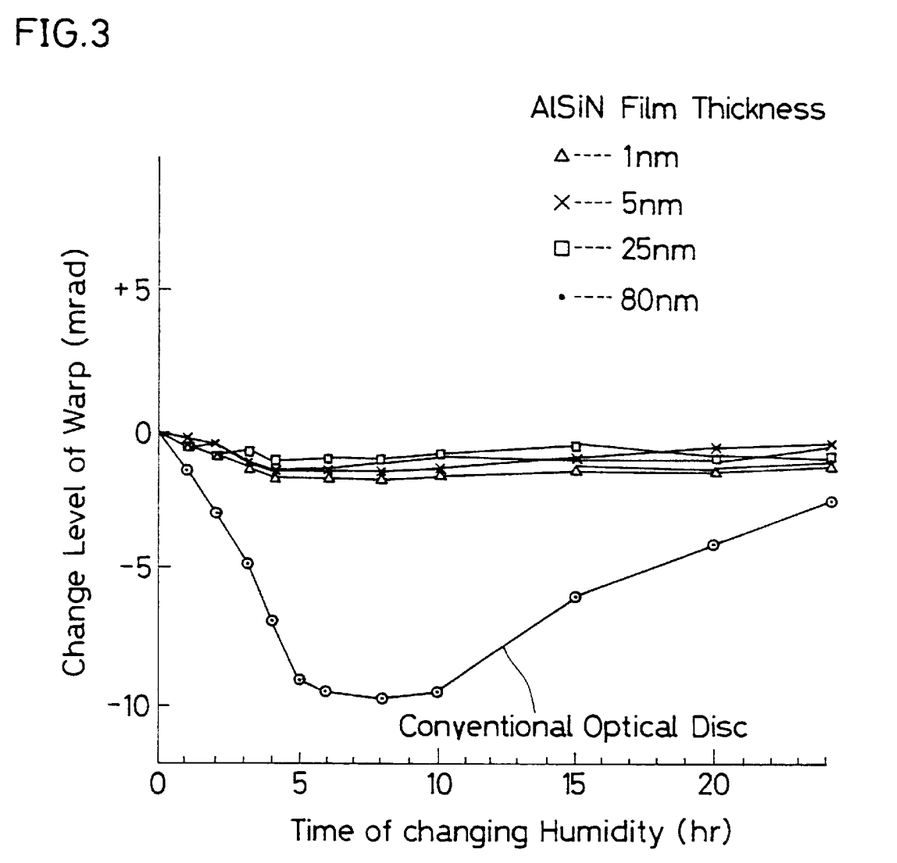
FIG. 3 is a graph showing the variation of warp in Embodiment 1 of the optical disc according to the present invention.

FIG. 3 shows a graph illustrating the result of the test. The axis of abscissa represents the passage of time from the initiation of the change in temperature whereas the axis of ordinates represents warp of optical discs. In all the embodiments of optical discs according to the present invention, the warp level of optical discs are limited to 2 mrad or less.

It naturally follows from the above observation that the thickness of 1 nm or more in AlSiN film serving as a moisture proof film sufficiently inhibits the generation of warp of magneto-optical discs and that moire patterns cannot be observed from the side of the second protection film 5.

Here, the lower limit value of 1 nm in the AlSiN film in the moisture proof film was set by confirming the effect of inhibiting a transient warp of magneto-optical discs. In the same manner, the upper limit value was set by confirming in the calculation of the above three layer model and actual observation of moire patterns that the reflectance of 8% or less obtained in the calculation does not produce almost no moire pattern appeared. FIG. 2 shows that the thickness of 20 nm in the AlSiN film provides a reflectance of 8%.

Setting the upper limit value will be detailed hereinafter.

As mentioned above, when the calculated reflectance does not exceed 8%, almost no moire pattern appeared on optical discs tentatively manufactured for the test. In the above three layer model, the thickness of the moisture proof film 4 providing a reflectance of 8% varies with the refractive index of the moisture proof film 4. Here, the refractive index of the polycarbonate serving as a plastics substrate 1 and the refractive index of the polyurethane acrylate ultraviolet curing resin serving as a second protection film 5 were set to 1.58 and 1.5 respectively. In other words, the calculations allows for multiplex interferences Consequently, the reflectance changes along with the change in the value of the light wavelength generated by the diffractive index multiplied by the film thickness. In other words, obtaining the same reflectance requires the same light wavelength. As a result, when the moisture proof film 4 using AlSiN exhibiting a diffractive index of 2: 1 has an upper limit thickness of 20 nm, it also has a light wavelength of 42 nm. Besides, moisture proof films having a lower limit thickness of 1 nm has a light wavelength of about 2 nm.

As explained above, setting the thickness of the moisture proof film 4 within the scope of 2 to 42 nm enables the clarification of why no moire pattern cannot be observed in magneto-optical discs.

Incidentally, the lower limit of the thickness of the moisture proof film 4 is set to 1 nm which can be confirmed in the test. This minimum thickness of the moisture proof film 4 depends the accuracy of the measurement of the thickness (using a contact type film thickness meter, for example) and the thickness control capability of vapor deposition and a sputtering apparatus used in forming the moisture proof film 4. Consequently, such film thickness can be obtained easily with a machine that can accurately reproduce the moisture proof film having a thickness thinner than the lower limit value, or a thickness of 0.5 nm. It can be easily estimated from the test in FIG. 3 that the magneto-optic discs with a moisture proof film in such thickness inhibits or reduces a transient warp of the disc compared with discs with a moisture proof film in a thickness of 0, or discs with no moisture proof film. Consequently, the lower limit of the thickness of the moisture proof film exceed 0 nm excluding 0 nm.

On the other hand, the upper limit of the moisture proof film 4 was set to 20 mm or less, which produces a reflectance of 8% or less, on the basis of the observation of moire patterns on the disc actually manufactured. However, FIG. 2 shows that the range of the thickness of the moisture proof film producing a reflectance of 8% also occurs between 120 nm and 200 nm. This has resulted from the fact that the reflectance in a cycle of wavelength/(2 X refractive index) takes the same value owing to the light interference in the AlSiN film serving as the moisture proof film 4. In FIG. 2, the reflectance varies in a cycle of a film thickness of 186 nm obtained by substituting the wavelength of 780 nm and the refractive index of 2.1 in the AlSiN film. Consequently, the film thickness producing a reflectance of 8% or less occurs in three ranges; 1 to 20 nm, 120 nm to 206 nm and 306 nm to 392 nm.

However, it is apparent that the thickness of the moisture proof film 4 should be advantageously in the most thin range possible, namely in the range of 1 to 20 nm considering time and cost required for manufacturing the film.

In the above embodiment, the first protection film 3 and the second protection film need not be made of the same material in the same thickness. A transient warp of the disc can be inhibited by setting the material and the thickness inhibits a transient warp in such a manner that the warp of the moisture absorption and desorption can be offset to each other. For example, the first protection film 3 may be formed of polyurethane ultraviolet curing resin whereas the second protection film 5 may be formed of acryl hard coat resin Embodiment 2

Figure 4:
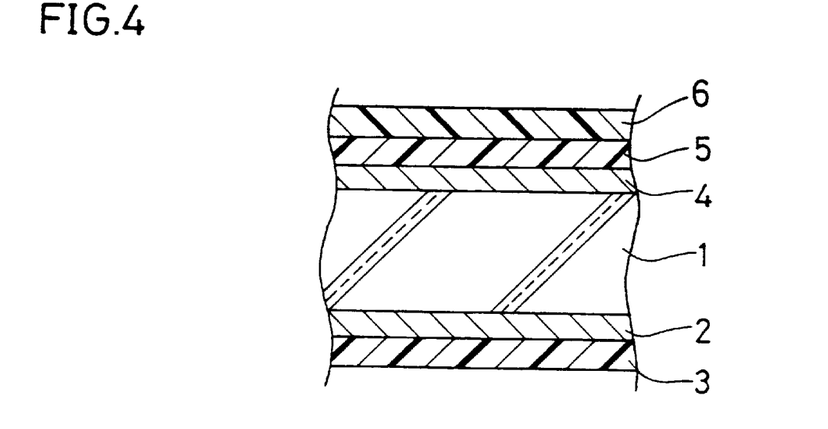
FIG. 4 is a schematic view of Embodiment 2 of the optical disc according to the present invention.

Embodiment 2 of the optical disc according to the present invention is constructed in the same manner as Embodiment 1 of the magneto-optic disc except that an anti-static film (having a thickness of about 4 μm) formed of acryl hard coat resin mixed with a conductive filler is formed on a second protection film formed on a moisture proof film. Incidentally, the AlSiN moisture proof film has a thickness of about 10 nm in terms of the light wavelength.

Embodiment 2 of the optical disc will be detailed as follows with reference to FIG. 4.

Referring to FIG. 4, Reference Numeral 1 designates a plastics substrate formed of 1.2 mm thick polycarbonate transparent to light. On one surface of this plastics substrate is formed a recording film 2. When the recording film 2 is formed of a magneto-optical recording film, the optical disc consists of four layers. This particular Embodiment of the optical disc is formed of AlSiN/DyFeCa/AlSiN/Al as viewed from the side of the plastics substrate 1. Further, on this recording film 2, the first protection film 3 is formed. The first protection film 3 is formed by coating polyurethane acrylate ultraviolet curing ray resin to a thickness of 10 μm.

Reference Numeral 4 designates the moisture proof film formed on the opposite side of the plastics substrate 1. On this moisture proof film 4 was formed the second protection film 5. The second protection film 5 was formed of material same as the first protection film 3. That is, polyurethane acrylate ultraviolet curing resin was used and it had a thickness of about 6 μm. On the second protection film 5 the anti-static film 6 formed of acryl hard coat resin mixed with a conductive filler was formed to a thickness of about 4 μm.

No moire pattern was observed when viewing the magneto-optical disc from the side of the anti-static film 6. Besides the warp level exhibited 2 mrad or less.

This magneto-optic disc was provided with a anti-static film 6 on the surface of the side light strikes for recording, erasing and reproducing data, thereby making it very difficult for dusts and small particles that tend to scatter light to deposit onto the surface of the optical disc. This has largely reduced the possibility that the focusing servo or the tracking servo might get disordered in the cycle of recording, erasing and reproducing data to degrade the recording signals or reproducing signals or to generate the track jump.

Besides the level of the transient warp in Embodiment 2 exhibited almost the same value as Embodiment 1 of the magneto-optic disc. This is because polyurethane arylate ultraviolet curing resins serving as the second protection film 5 had the same degree of moisture absorption and desorption as conductive filler mixed acrylic hard coat resins serving as the anti-static film 6 and because the thickness of the combination of the second protection film 5 and the anti-static film 6 was set to about 10 μm identical to the thickness of the first protection film 3. For reference, it is to be noted that increasing only the second protection film 5 from 6 μm to 10 μm has increased somewhat the level of warp.

Embodiment 3

Figure 5:
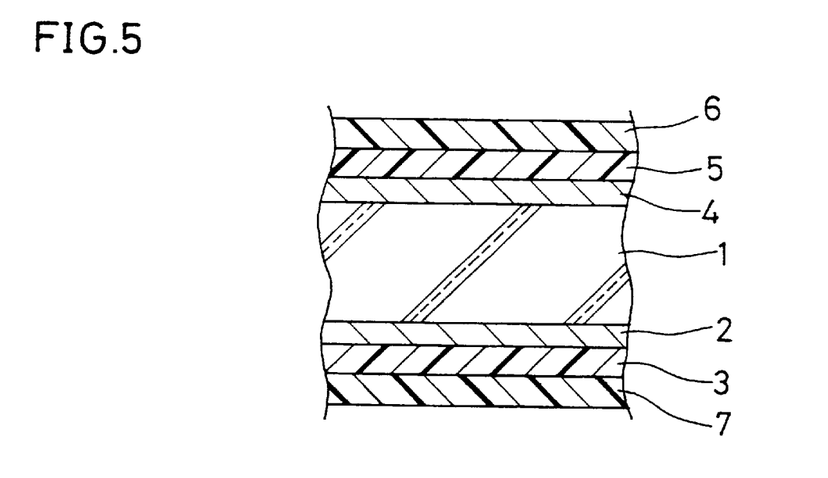
FIG. 5 is a schematic view of Embodiment 3 of the optical disc according to the present invention.

Embodiment 3 of the optical disc according to the present invention was produced by forming a lubricant film formed on fluoric resin with excellent lubricative properties to a thickness of about 2 μm on the first protection film provided on the recording film of the magneto-optical shown in Embodiment 2.

Embodiment 3 will be detailed as follows with reference to FIG. 5.

Referring to FIG. 5, Reference Numeral 1 designates a plastics substrate formed of transparent polycarbonate having a thickness of 1.2 mm. On one surface of the plastics substrate 1 is formed a recording film 2. The recording film for use in a magneto-optic disc consist of four layers. In this particular Embodiment, the four layers are formed in the order of AlSiN/DyFeCo/AlSiN/Al from the side of the plastics substrate 1. The first protection film 3 is formed by coating a polyurethane acrylate ultraviolet curing resin to a thickness of about 8 μm whereas the lubricant film 7 is formed of fluoric resin to a thickness of about 2 μm.

Reference numeral 4 designates a moisture proof film formed on the other side of the plastics substrate 1. In this particular Embodiment, AlSiN film with a refractive index of 2.1 is formed to a thickness of about 5 nm. On this moisture proof film 4 is formed the second protection film 5. The second protection film 5 uses the same material as the first protection film 3, namely polyurethane acrylate ultraviolet curing resin having a thickness of about 6 μm. On the second protection film 5 is formed the anti-static film 6 formed of acrylate hard coat resin mixed with a conductive filler to a thickness of about 4 μm.

No moire pattern was observed when the magneto-optic disc was observed from the side of the anti-static film 6. The level of a transient warp was examined in the similar manner as Embodiment 1 to show 2 mrad or less.

Besides, the lubricant film 7 was provided on the surface of the side provided with this particular Embodiment of the magneto-optical disc according to the present invention. Consequently, using a floating type magnetic head permitted improvement in the lubrication between the floating type magnetic head and the magneto-optical disc.

In other words, the floating type magnetic head is disposed to record and erase data on the recording medium film 2 with a gap of several to 15, 16 μm kept therebetween. The above gap is kept by taking a balance between the pressure by a suspension spring that works to press the floating type magnetic head to the recording film and the floating force generated by the air stream of high speed rotation of the magneto-optic disc to separate-the floating type magnetic head from the recording film 2.

When using such conventional floating type magnetic head, the floating type magnetic head may be broken until it stops depending on time required for reaching to the predetermined number of rotations from the start of the rotation of the magneto-optic disc and the predetermined number of rotations at the end of the rotation of the disc. This is caused by the adsorption of the floating type magnetic head and the optical magnetic head when contact-start-stop (CSS) method is adopted in which the floating head and the optical magnetic head contact each other.

However, the magneto-optic disc provides a lubricant film on the recording film to improve lubricative properties between the floating type magnetic head and the magneto-optic disc, thereby inhibiting breakage of the floating type magnetic head because of adsorption of the two heads.

Embodiment 4

Embodiment 4 of the optical disc according to the present invention was constructed in the same manner as Embodiment 1 except that AlTaN was used as a moisture proof film 4. AlTaN film used therein had a refractive index of about 2.1 approximately equal to AlSiN film used in Embodiment 1.

In the same manner as Embodiment 1, five magneto-optic discs were tentatively manufactured respectively having a 5 nm thick, a 10 nm thick, a 20 nm thick, 25 nm thick and a 80 nm thick AlTaN moisture proof film to be examined from the side of the moisture proof film 4. The examination showed that no moire pattern was observed on the magneto-optic discs having a 5 nm thick and a 10 nm thick moisture proof film. On the other hand, a light moire pattern was observed on magneto-optic discs having a 20 nm thick moisture proof film 4 with much attention, with nearly inconspicuous degree. Besides, moire pattern was observed on magneto-optic discs having a 25 nm thick and a 80 nm thick moisture proof film 4. The moire pattern was more conspicuous on the magneto-optic disc having a 80 nm moisture proof film than the disc having a 25 nm thick moisture proof film.

Further, in the same manner as Embodiment 1, four magneto-optic discs were tentatively manufactured respectively having a 1 nm thick, a 5 nm thick, a 25 thick and a 80 nm thick AlTaN moisture proof film 4. Consequently, the level of warp in the magneto-optic disc according to the present invention was limited to 2 mrad or less in the same manner as Embodiment 1.

As mentioned above, setting the thickness of the AlTaN moisture proof film to 1 to 20 nm inhibited the generation of a transient warp of magneto-optic disc and further allows making the moire pattern unobservable from the side of the second protection film 5.

Besides, in Embodiments 2 and 3, an magneto-optical disc was temporarily manufactured having a moisture proof film 4 to confirm the similar effect produced in the magneto-optic disc.

Embodiment 5

Embodiment 5 of the optical disc according to the present invention was manufactured by using a TaO moisture proof film 4 in a magneto-optic disc having a structure shown in Embodiment 1. The TaO moisture proof film used in this particular Embodiment has a refractive index of 2.1 which is almost the same as AlSiN film.

In the same manner as Embodiment 1, five magneto-optic discs were tentatively manufactured respectively having a 5 nm thick, a 10 nm thick, a 20 nm thick, a 25 nm thick and a 80 nm thick moisture proof film 4. Observation of moire patterns from the side of the moisture proof film 4 made clear that no moire pattern was observed on the magneto-optic discs respectively having a 25 nm thick and a 80 nm thick moisture proof film. Much clearer moire pattern was observed on the optical disc having a 80 nm moisture proof film.

Further, in the similar way as Embodiment 1, four optical discs were tentatively manufactured having a TaN film respectively having a 1 nm thick, a 5 nm thick, a 25 nm thick, and a 80 nm thick moisture proof film to examine the level of warp at environmental changes similar to the one described in Embodiment. The examination clarified that the level of warp in the magneto-optic disc in this Embodiment was inhibited to 2 mrad or less in the similar way as Embodiment 1.

Thus, setting the: thickness of TaO moisture proof film 4 in the range of 1 to 20 nm inhibits a transient warp of the magneto-optic disc and further allows making the moire pattern unobservable from the side of the second protection film 5.

Besides, a magneto-optic disc having TaO moisture proof film using the structure of Embodiment 2 and 3 was tentatively manufactured to confirm that it can produce the similar effect.

Embodiment 6

Embodiment 6 of the magneto-optic disc having a SiO moisture proof film was manufactured in the same manner as Embodiment 1 except that SiO film was used as a moisture proof film 4.

The refractive index of the SiO film used in the Embodiment exhibited 2.1 approximately identical to AlSiN film in Embodiment 1.

In the same manner as Embodiment 1, five magneto-optic discs were tentatively manufactured respectively having a 5 nm thick, a 10 nm thick, a 20 nm thick, a 25 nm thick and a 80 nm thick SiO moisture proof film to prove that no moire pattern was observed-on the magneto-optic discs respectively having a 5 nm thick and a 10 nm thick moisture film. In addition, a slight moire pattern was observed on the magneto-optic disc with a 20 nm thick moisture proof film 4 when observed with much attention. On the other hand., moire patterns were observed on magneto-optic discs respectively having a 25 nm and 80 nm thick moisture proof film. The moire pattern was more clearly observed on the magneto-optic disc with a 80 nm thick moisture proof film.

Further, in the same manner as Embodiment 1, four magneto-optic discs were tentatively manufactured with a SiO moisture proof film 4 respectively having a thickness of 1 nm, 5 nm, 25 nm and 80 nm to examine the level of transient warp at environmental changes. The examination made clear that the level of warp was limited to 2 mrad or less.

Thus, setting the thickness of the $TiO_2$ moisture proof film 4 to 1 to 15 nm inhibits a transient warp of the magneto-optic disc and further allows making the moire pattern unobservable from the side of the second protection film 5.

Besides, a magneto-optic disc was tentatively manufactured also in the same manner as Embodiments 2 and 3 having a SiO moisture proof film 4 to confirm the same effect-can be realized.

Embodiment 7

Embodiment 7 of the magneto-optic disc according to the present invention was tentatively manufactured in the same manner as Embodiment 2 except that $TiO_2$ was used as a moisture proof film 4. The $TiO_2$ used therein has refractive index higher than any other material mentioned above, exhibiting about 2.5.

In the same manner as Embodiment 1, five magneto-optic discs were manufactured respectively having a 5 nm thick, a 15 nm thick, a 20 nm thick, a 25 nm thick and a 80 nm thick $TiO_2$ moisture proof film to examine them from the side of the moisture proof film 4. The examination showed that no moire pattern was observed on the magneto-optic discs having a 5 nm thick and a 15 nm thick moisture proof film. In addition, a slight moire pattern was observed on the magneto-optic disc having a 20 nm thick moisture proof film 4 with much attention. On the other hand, moire patterns were observed on magneto-optic discs respectively having a 25 nm and a 80 nm thick moisture proof film. The moire pattern was more clearly observed on the magneto-optic disc with a 80 nm thick moisture proof film.

Further in the same manner as Embodiment 1, four magneto-optic discs were tentatively manufactured respectively having a 1 nm thick, a 5 nm thick, a 25 nm thick and a 80 nm thick moisture proof film to examine the level of the transient warp at environmental changes. The examination showed that the warp level of the Embodiment of the magneto-optic disc was limited to 2 mrad or less.

Thus, setting the thickness of the $TiO_2$ moisture- proof film within the range of 1 through 15 nm inhibits the transient warp of the disc and further allows making the moire pattern unobservable from the second protection film 5. Here, in order to set the light wavelength of 42 nm obtained by multiplying the refractive index and the film thickness, the thickness of the $TiO_2$ film with a refractive index of 2.5 is set to about 17 nm. The Embodiment discloses that moire pattern was observed on the magneto-optic disc with a 15 nm thick $TiO_2$ moisture proof film. However, it also discloses almost no moire pattern was observed on magneto-optic discs with a 17 nm or less thick moisture proof film.

Besides, in Embodiments 2and 3, magneto-optic discs were tentatively manufactured with a $TiO_2$ moisture proof film 4 to confirm that the discs have the same effect.

The effect and the superiority will be detailed with respect to moisture proof films formed on AlSiN, AlTaN, TaO, SiO and $TiO_2$.

Firstly, the above materials are formed on both or one sides of the magneto-optic recording layer in the recording film 4 to inhibit the oxidation of a thin film formed of rare earth transition metal alloy such as DyFeCo, GdTbFe, TbFeCo, TbDyFeCo, GdDyFeCo, GdDyFe and the like. They are suitable for an oxidation protection film 4 for obtaining long-term durability.

Secondly, as mentioned above, AlSiN, AlTaN, TaO, SiO, $TiO_2$ are formed on both or one sides of the magneto-optic layer in the recording layer 2. Consequently, directly using a thin film manufacturing device such as a sputtering apparatus or the like for forming a magneto-optic disc to form the moisture proof film 4, which facilitates the manufacturing process thereof.

Thirdly, particularly with respect to the magneto-optic disc having a 4 layer recording film whose structure is shown in the above Embodiment, AlSiN film constituting a first and a second transparent film serves as a antioxidant film as well as a magneto-optic enhancement layer for improving the signal quality. It is known that heightening this enhancement effect requires an increase in the refractive index of the above film. Thus, AlSiN, AlTaN, TaO, SiO and $TaO_2$ with a relatively high refractive index of about 2 are suitable for it, despite the transparency of the film.

Incidentally, a thin film formed of AlSiN, AlTaN, TaO, SiO and $TiO_2$ is formed by a normal sputtering apparatus. However, changing the sputtering conditions allows the control of the refractive index of these materials within the range of about 1.7 to 2.6.

For example, AlSiN and AlTaN are respectively used as an AlSi-made alloy target or AlTa alloy-made target, which is formed with a reactant sputtering method using $N_2$ or $N_2+Ar$ as a sputtering gas. Changing the pressure and the flow rate of this sputtering gas allows the control of the refractive index of these materials within the above range.

By the way, as mentioned above, when using AlSiN, AlTaN, Tao, SiO, $TiO_2$ as a transparent film for use in the recording film 2 of the magneto-optic disc the refractive index should be advantageously raised to heighten the enhancement effect. Thus, in Embodiment 1, the refractive index was set to a rather high level of 2.1 to coincide the refractive index of AlSiN serving as-the moisture proof film 4 with the counterpart of the above transparent film. Such procedure allowed a continuous formation of the transparent film of the recording film 2 and the moisture proof film 4 in the same manufacturing apparatus under the same manufacturing conditions to realize a high productivity.

Further, the present invention provides a very thin film having a thickness of 42 nm in terms of light wavelength to make the moire pattern invisible and to inhibit the transient warp, thereby making the manufacturing cost and time.

In the above Embodiment, polycarbonate was used as a plastics substrate 1. The plastics substrate 1 can be formed of such materials as acrylic resin and epoxy resin in addition to polycarbonate.

As disclosed above, the optical disc of the present invention accompanied with few transient element at environmental changes has the effect of making obscure moire patterns seen from the side which light strikes.

Besides, optical discs according to the present invention is typified by a magneto-optic disc which includes a compact disc, a write-once disc, and a photochromic type disc using as a recording film photochromic material.

What is claimed is:

1. An optical disc comprising a recording film formed on one surface of a plastic substrate transparent to light, a first protection film formed on the recording film, a moisture proof film formed on the other surface of the substrate, and a second protection film formed on the moisture proof film, wherein the moisture proof film consists of AlSiN, and wherein a product of the refractive index of the moisture proof film and the thickness thereof is 42 nanometers or less.

2. An optical disc of claim 1 wherein the thickness of the moisture proof film is in the range of 1 to 20 nanometers.

3. An optical disc of claim 1 wherein the thickness of the moisture proof film is in the range of 5 to 15 nanometers.

4. An optical disc of claim 1 wherein a lubricant film is further formed on the first protection film.

5. An optical disc of claim 1 wherein an anti-static film is further formed on the second protection film.

6. An optical disc of claim 1 wherein the first protection film and the second protection film each has a thickness in the range of 2 to 20 micrometers.

7. An optical disc of claim 6 wherein the first protection film and the second protection film have an approximately same thickness.

* * * * *